(12) United States Patent
Rotta

(10) Patent No.: US 11,079,918 B2
(45) Date of Patent: Aug. 3, 2021

(54) ADAPTIVE AUDIO AND VIDEO CHANNELS IN A GROUP EXERCISE CLASS

(71) Applicant: Technogym S.p.A., Cesena (IT)

(72) Inventor: Andrea Rotta, Abbiategrasso (IT)

(73) Assignee: Technogym S.p.A., Cesena (IT)

( * ) Notice: Subject to any disclaimer, the term of this patent is extended or adjusted under 35 U.S.C. 154(b) by 0 days.

(21) Appl. No.: 16/283,099

(22) Filed: Feb. 22, 2019

(65) Prior Publication Data
US 2020/0272311 A1  Aug. 27, 2020

(51) Int. Cl.
*G06F 3/048* (2013.01)
*G06F 3/0484* (2013.01)
(Continued)

(52) U.S. Cl.
CPC .......... *G06F 3/04847* (2013.01); *A63B 22/02* (2013.01); *A63B 22/0605* (2013.01); *A63B 22/0664* (2013.01); *A63B 71/0622* (2013.01); *G06F 3/0482* (2013.01); *G06F 3/165* (2013.01); *A63B 2071/063* (2013.01);
(Continued)

(58) Field of Classification Search
CPC ............ A63B 71/0622; A63B 24/0062; A63B 24/0087; A63B 2220/20; A63B 2071/065; G06F 3/04847; G06F 3/165; G06F 3/167
See application file for complete search history.

(56) References Cited

U.S. PATENT DOCUMENTS

| 5,215,468 A | * | 6/1993 | Lauffer | .............. A63B 71/0622 |
| | | | | 434/236 |
| 5,616,104 A | | 1/1997 | Mulenburg et al. | |

(Continued)

FOREIGN PATENT DOCUMENTS

| AT | 505617 A4 | 3/2009 |
| CN | 101842138 A | 9/2010 |

(Continued)

OTHER PUBLICATIONS casalini, Filippo, "Real-Time and Dynamically Generated Graphical User Interfaces for Competitive Events and Broadcast Data," U.S. Appl. No. 16/289,243, filed Feb. 28, 2019, Specification, Claims, Abstract, and Drawings, 50 pages.

(Continued)

*Primary Examiner* — Claudia Dragoescu
(74) *Attorney, Agent, or Firm* — Carr & Ferrell LLP

(57) ABSTRACT

Systems and methods for adaptive delivery of audio and/or video channels in a group exercise class are provided. Exemplary methods include: receiving audio and video from the selected source over a communications network, the audio and video comprising the group exercise class; providing the audio and video from the selected source, a volume level for each channel of the audio being at a respective initial value, the audio mixer including a control for each audio channel associated with the selected source; receiving an input indicating a change in volume to an audio channel using the audio mixer; changing a volume of the audio channel responsive to the input; making a first volume change to a volume of another audio channel when a first condition is satisfied; and making a second volume change to the volume of the another audio channel when a second condition is satisfied.

32 Claims, 12 Drawing Sheets

(51) Int. Cl.
  *A63B 22/02* (2006.01)
  *A63B 22/06* (2006.01)
  *A63B 71/06* (2006.01)
  *G06F 3/0482* (2013.01)
  *G06F 3/16* (2006.01)

(52) U.S. Cl.
  CPC . *A63B 2071/065* (2013.01); *A63B 2071/0658* (2013.01); *A63B 2220/806* (2013.01); *A63B 2220/808* (2013.01); *A63B 2230/067* (2013.01)

(56) References Cited

U.S. PATENT DOCUMENTS

| | | |
|---|---|---|
| 6,050,924 A | 4/2000 | Shea |
| 6,450,922 B1 | 9/2002 | Henderson et al. |
| 6,902,513 B1 | 6/2005 | McClure |
| 7,651,423 B2 | 1/2010 | Ichida et al. |
| 10,272,280 B2 | 4/2019 | Leonardi et al. |
| 10,576,348 B1 | 3/2020 | Hawkins, III et al. |
| 11,040,247 B2 | 6/2021 | Casalini |
| 2003/0171190 A1 | 9/2003 | Rice |
| 2006/0003872 A1 | 1/2006 | Chiles et al. |
| 2006/0084551 A1* | 4/2006 | Volpe, Jr. ............ G06F 19/3481 482/8 |
| 2006/0234840 A1 | 10/2006 | Watson et al. |
| 2007/0281828 A1 | 12/2007 | Rice |
| 2008/0103030 A1 | 5/2008 | Watson et al. |
| 2008/0207402 A1 | 8/2008 | Fisher et al. |
| 2009/0011907 A1 | 1/2009 | Radow et al. |
| 2009/0118099 A1 | 5/2009 | Fisher et al. |
| 2009/0217780 A1 | 9/2009 | Evett |
| 2009/0227429 A1 | 9/2009 | Baudhuin |
| 2010/0113223 A1 | 5/2010 | Chiles et al. |
| 2010/0292600 A1 | 11/2010 | DiBenedetto |
| 2011/0118086 A1 | 5/2011 | Radow et al. |
| 2011/0196519 A1* | 8/2011 | Khoury .............. H04N 21/4325 700/94 |
| 2012/0238406 A1 | 9/2012 | Beard et al. |
| 2013/0059698 A1 | 3/2013 | Barton |
| 2014/0171266 A1 | 6/2014 | Hawkins, III et al. |
| 2014/0224055 A1 | 8/2014 | Cracco et al. |
| 2014/0361511 A1 | 12/2014 | Thompson |
| 2014/0378280 A1 | 12/2014 | Kristiansen et al. |
| 2015/0080190 A1 | 3/2015 | Kaan et al. |
| 2015/0228262 A1* | 8/2015 | Silfvast .................. H04H 60/04 381/119 |
| 2015/0290490 A1 | 10/2015 | Badarneh |
| 2015/0344103 A1 | 12/2015 | Kuroda |
| 2015/0344104 A1 | 12/2015 | Kuroda |
| 2016/0236751 A1 | 8/2016 | Rosen |
| 2016/0266867 A1* | 9/2016 | Olesh ...................... G06F 3/165 |
| 2016/0311483 A1 | 10/2016 | Laronde |
| 2017/0334518 A1 | 11/2017 | Bortoli et al. |
| 2018/0001142 A1 | 1/2018 | Viarani et al. |
| 2018/0036586 A1 | 2/2018 | Cristofori et al. |
| 2018/0043206 A1 | 2/2018 | Crist et al. |
| 2018/0056132 A1 | 3/2018 | Foley et al. |
| 2018/0126248 A1* | 5/2018 | Dion ..................... H04L 65/403 |
| 2018/0126249 A1 | 5/2018 | Consiglio et al. |
| 2018/0140903 A1 | 5/2018 | Poure et al. |
| 2019/0143194 A1 | 5/2019 | Evancha et al. |
| 2020/0009444 A1 | 1/2020 | Putnam |
| 2020/0147449 A1 | 5/2020 | Liu et al. |

FOREIGN PATENT DOCUMENTS

| | | |
|---|---|---|
| CN | 102893063 A | 1/2013 |
| CN | 107684696 A | 2/2018 |
| EP | 2564904 A1 | 3/2013 |
| EP | 2571280 A2 | 3/2013 |
| EP | 2703051 A2 | 3/2014 |
| EP | 2949367 A1 | 2/2015 |
| EP | 3278842 A2 | 2/2018 |
| EP | 3278842 A3 | 6/2018 |
| IT | 102016000083062 A1 | 8/2016 |
| TW | 201808403 | 6/2017 |
| WO | WO87/01953 | 4/1987 |
| WO | WO1992020408 A1 | 11/1992 |
| WO | WO2008002644 A2 | 1/2008 |
| WO | WO200903170 A1 | 12/2008 |
| WO | WO2018035117 A1 | 2/2018 |

OTHER PUBLICATIONS

"Search Report" and "Written Opinion," Italian Patent Application No. IT201600083062, dated Apr. 21, 2017, 5 pages (7 pages including English Translation).

"Office Action," Chinese Patent Application No. 201710662848.4, dated Jan. 21, 2019, 8 pages (15 pages including English Translation).

"Extended European Search Report", European Patent Application No. EP20159062.7, dated Jun. 16, 2020, 6 pages.

"Extended European Search Report", European Patent Application No. EP20158332.5, dated Jun. 26, 2020, 8 pages.

\* cited by examiner

ADAPTIVE AUDIO AND VIDEO CHANNELS IN A GROUP EXERCISE CLASS

FIELD OF THE INVENTION

The present technology pertains to personalized presentation of broadcast audio and video channels.

BACKGROUND ART

Exercise equipment is various apparatus and/or devices used during aerobic physical activity to enhance the strength or conditioning effects of that exercise by providing either fixed or adjustable amounts of resistance, or to otherwise enhance the experience or outcome of an exercise routine.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for adaptive delivery of audio and/or video channels in a group exercise class. Specifically, a method for adaptive delivery may comprise: getting a selected source from a user; receiving audio and video from the selected source over a communications network, the audio and video comprising the group exercise class; providing the audio and video from the selected source, a volume level for each channel of the audio being at a respective initial value, the video being from a default camera; displaying an audio mixer, the audio mixer including a control for each audio channel associated with the selected source; receiving an input indicating a change in volume to an audio channel using the audio mixer; changing a volume of the audio channel responsive to the input; making a first volume change to a volume of another audio channel when a first condition is satisfied; and making a second volume change to the volume of the another audio channel when a second condition is satisfied.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
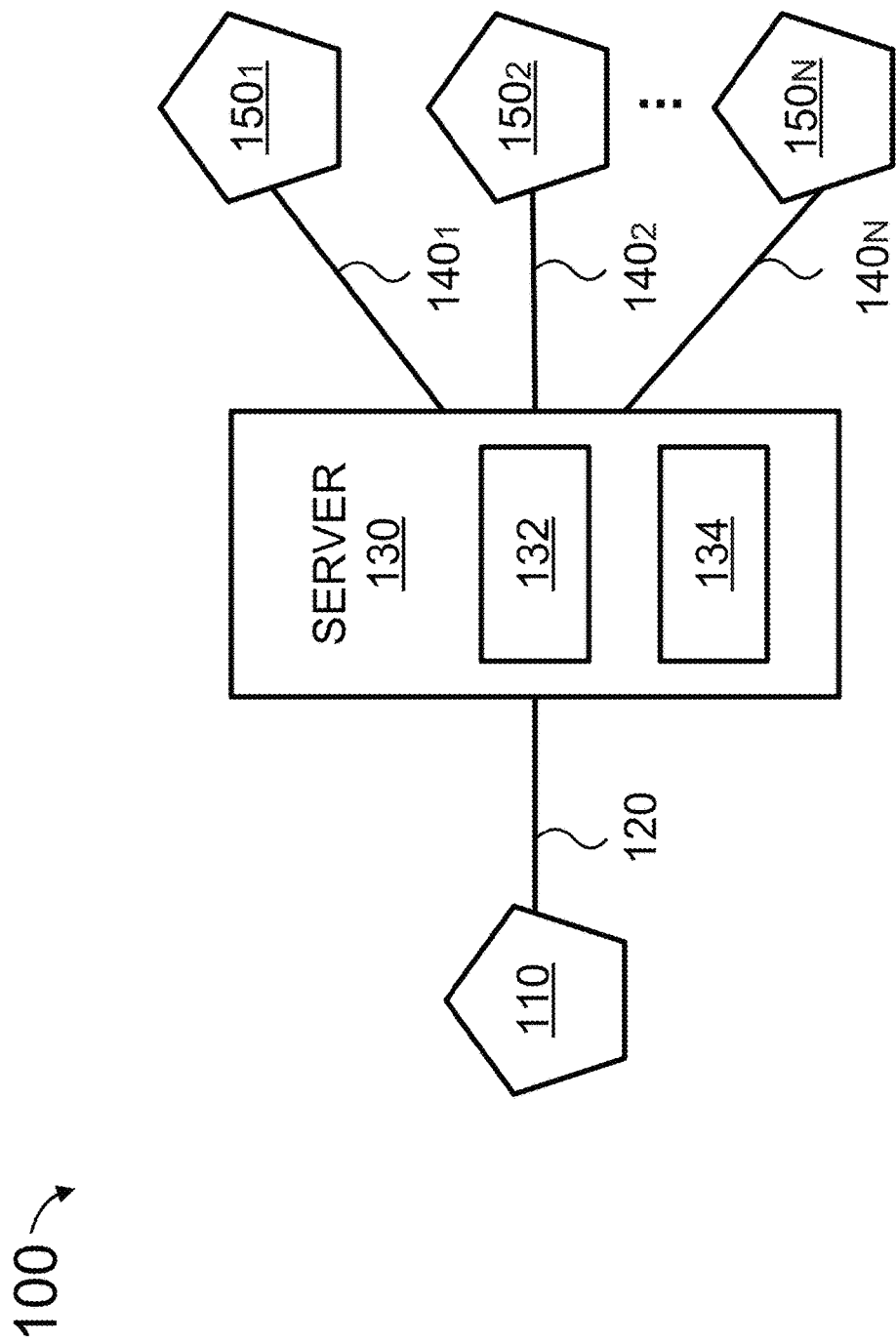
FIG. 1 is a simplified block diagram of a system for adaptive delivery of audio and/or video channels in a group exercise class, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows system 100 for adaptive delivery of audio and/or video feeds in a group exercise class, according to some embodiments. System 100 includes trainer station 110, communications 120, server computing system 130, communications $140_1$-$140_N$, and stations $150_1$-$150_N$. Trainer station 110 can include a trainer or instructor (and associated exercise equipment, video and/or audio of the trainer or instructor (and exercise equipment), and the like) leading a live or recorded group exercise class. Stations $150_1$-$150_N$ can be users (and associated exercise equipment, video and/or audio of the user (and exercise equipment), and the like) in the group exercise class.

Group exercise classes use exercise equipment and the trainer or instructor leads users (at stations $150_1$-$150_N$) through an exercise routine using the exercise equipment. A group exercise class can be conducted where trainer station 110 and users (at stations $150_1$-$150_N$) are present at one location, trainer station 110 is at a different location (e.g., recording studio, different gym, and the like), stations $150_1$-$150_N$ are at one or more different locations (e.g., different gym, user's home, and the like), and combinations thereof.

Trainer station 110 communicates with server computing system 130 and stations $150_1$-$150_N$ over communications 120 and communications $140_1$-$140_N$, respectively. Each of communications 120 and communications $140_1$-$140_N$ can be a data communications network (e.g., various combinations and permutations of wired and wireless networks such as the Internet, local area networks (LAN), metropolitan area networks (MAN), wide area networks (WAN), and the like using Ethernet, Digital Subscriber Line (DSL), cable Internet access, Wi-Fi, cellular networks, and the like).

Server computing system 130 can include storage 132 and processing 134. Storage 132 can record live group exercise classes, buffer live exercises for delivery to stations $150_1$-$150_N$, and deliver previously-recorded group exercise classes to stations $150_1$-$150_N$. Processing 134 can encode/decode/transcode video and/or audio received from trainer station 110 and stations $150_1$-$150_N$ for delivery to others of stations $150_1$-$150_N$. Processing 134 can also authenticate stations $150_1$-$150_N$ so that live and recorded group exercises classes are delivered to authorized stations (e.g., there is a valid subscription to a service). In some embodiments, server computing system 130 is one or more physical computing systems, virtual machine, container, and the like, such as in a cloud computing environment. Server computing system 130 is described further in relation to FIG. 7.

Figure 2:
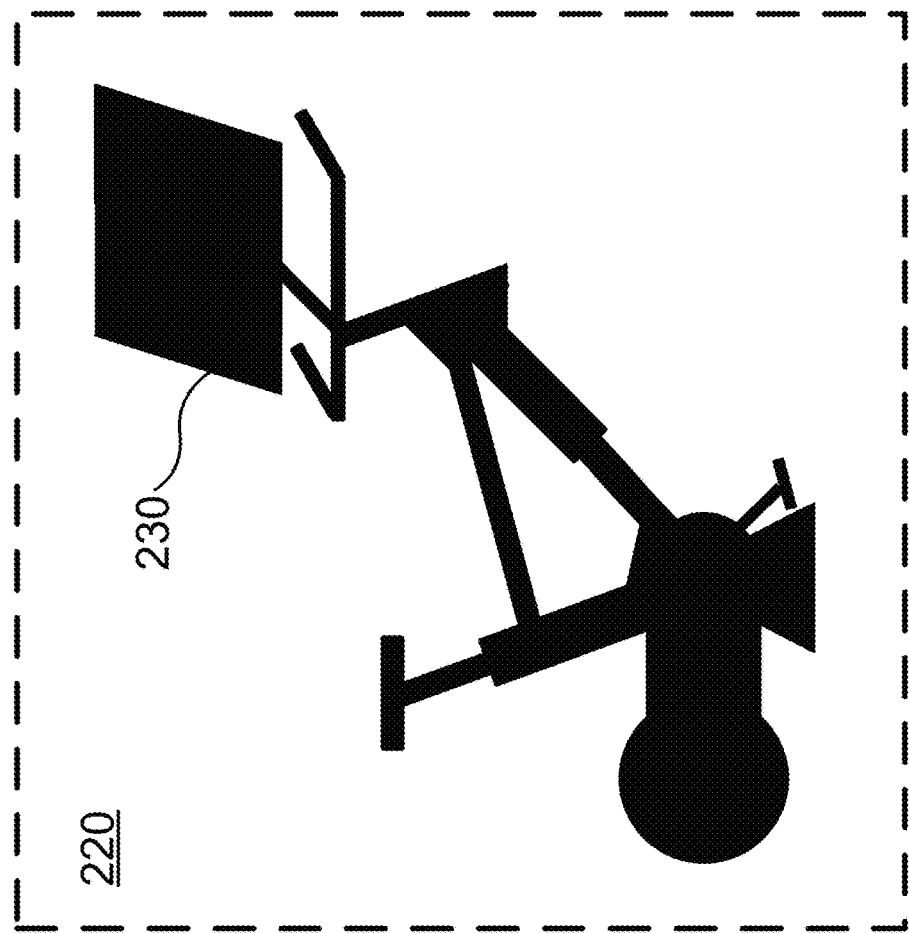
FIG. 2 is a simplified block diagram with a view of a station, according to various embodiments.
Figure 2:
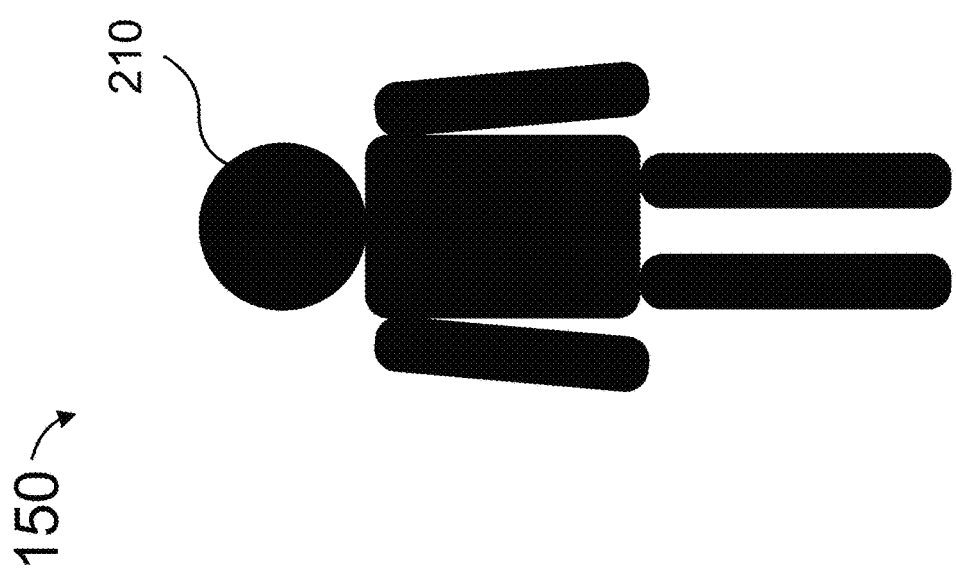

FIG. 2 depicts station 150 according to various embodiments. Stations 150₁-150_N (FIG. 1) can have at least some of the characteristics of station 150. Station 150 includes user 210 and exercise equipment 220. User 210 can operate exercise equipment 220. Exercise equipment 220 can be a stationary bicycle and include a saddle, pedals, and some form of handlebars. Exercise equipment 220 can include a resistance mechanism (e.g., magnets, fans, and friction mechanisms) for applying resistance to the pedals. Some embodiments allow the user 210 to pedal backwards to exercise antagonist muscles which are not exercised in forward pedaling.

Exercise equipment 220 can alternatively be a treadmill, elliptical trainer, and the like. Treadmills generally include a running table for walking, running, or climbing while staying in the same place. Elliptical trainers are generally stationary exercise machines which simulate stair climbing, walking, or running using pedals which are coupled to a four-bar linkage.

Exercise equipment 220 can include exercise equipment computing device 230. Exercise equipment computing device 230 can include a display to provide user 210 operating exercise equipment 220 with an interactive graphical user interface including control display elements, as well as display video. Exercise equipment computing device 230 can include channel inputs which communicate with server computing system 130 (FIG. 1) to receive media associated with a live and/or recorded group exercise class and decode/encode/transcode the media. Exercise equipment 220 can further include input and output devices, such as sensors (e.g., heart rate and blood oxygen level), a video camera, (electroacoustic) transducers (e.g., (stereo) speakers, wired/wireless (stereo) headphone(s), wired/wireless (stereo) earbuds, (stereo) microphone(s)), and the like. Exercise equipment computing device 230 can also include channel outputs, which decode/encode/transcode audio and/or video, and direct audio and/or video to output devices included in the exercise equipment computing device 230 and the user computing device.

In various embodiments, exercise equipment computing device 230 includes one or more faders. A fader maintains (holds), increases (raises), and decreases (lowers) the level (volume) of an audio signal, such as audio media (channels) associated with a live and/or recorded group exercise class. For example, the fader amplifies and/or attenuates the audio signal. A fader can include a (virtual) slider or knob, which is used by user 210 to control the fader, such as by moving the slider or turning the knob. An example (virtual) slider is described in relation to FIG. 4A. Exercise equipment computing device 230 is described further in relation to FIG. 7.

User 210 can have a user computing device (not depicted in FIG. 2), such as a smart watch, other wearable device, smart phone, phablet, tablet, notebook computer, and the like. Generally, the user computing device can communicate with exercise equipment computing device 230 using wired and/or wireless communications, such as Universal Serial Bus (USB), Ethernet, Wi-Fi, Bluetooth, Bluetooth Low Energy, and the like. The user computing device can include input and output devices, such as sensors (e.g., heart rate and blood oxygen level), a display, a video camera, (electroacoustic) transducers (e.g., (stereo) speakers, wired/wireless (stereo) headphone(s), wired/wireless (stereo) earbuds, (stereo) microphone(s)), and the like. The user computing device is described further in relation to FIG. 7.

Trainer station 110 (FIG. 1) can have at least some of the characteristics of station 150. In addition, trainer station 110 can be in an environment, such as recording studio or gym, which has multiple microphones (e.g., for stereo sound), video cameras (e.g., for different camera angles), sound baffle (e.g., to control ambient noise), and the like for capturing the live group exercise class.

Figure 3:
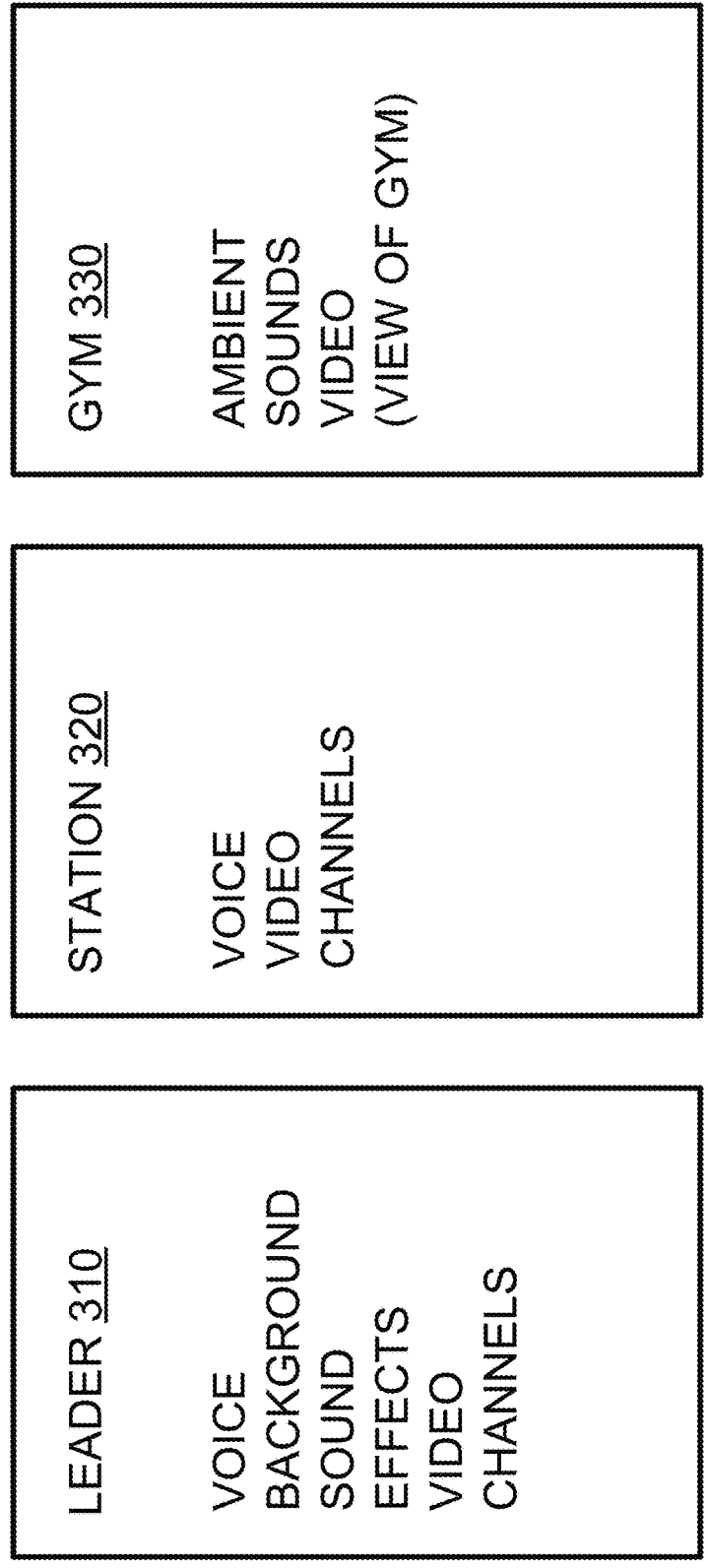
FIG. 3 is a simplified block diagram of example media sources and content, in accordance with some embodiments.

FIG. 3 depicts media sources and content 300, in accordance with some embodiments. Each audio source of media sources and content 300 can be monaural or stereo (e.g., two—(left and right), six—(5.1), and eight—(7.1) channel). Each video source of media sources and content 300 can be standard-definition, high definition (e.g., 720 p and 1080 p), ultra high definition (e.g., 2K, 4K, and 8K), three-dimensional stereoscopic, holographic, and the like. Media sources and content 300 includes leader media 310, station media 320, and gym media 330. Leader media 310 can be audio and/or video produced by trainer station 110 (FIG. 1), such as voice, background (e.g., music), sound effects, different video channels (e.g., for different camera angles), and the like.

Station media 320 can be (multiple) audio and/or video produced by stations 150₁-150_N (FIG. 1) and/or station 150 (FIG. 2), such as voice, music, video channels, and the like. Station media 320 can be from exercise equipment computing device 230 (FIG. 2) and the user computing device. Station media 320 can be received by trainer station 110 in FIG. 2 (e.g., to check on individual user status, chat with users, etc.) and/or other users (e.g., to have a chat between users).

Figure 4A:
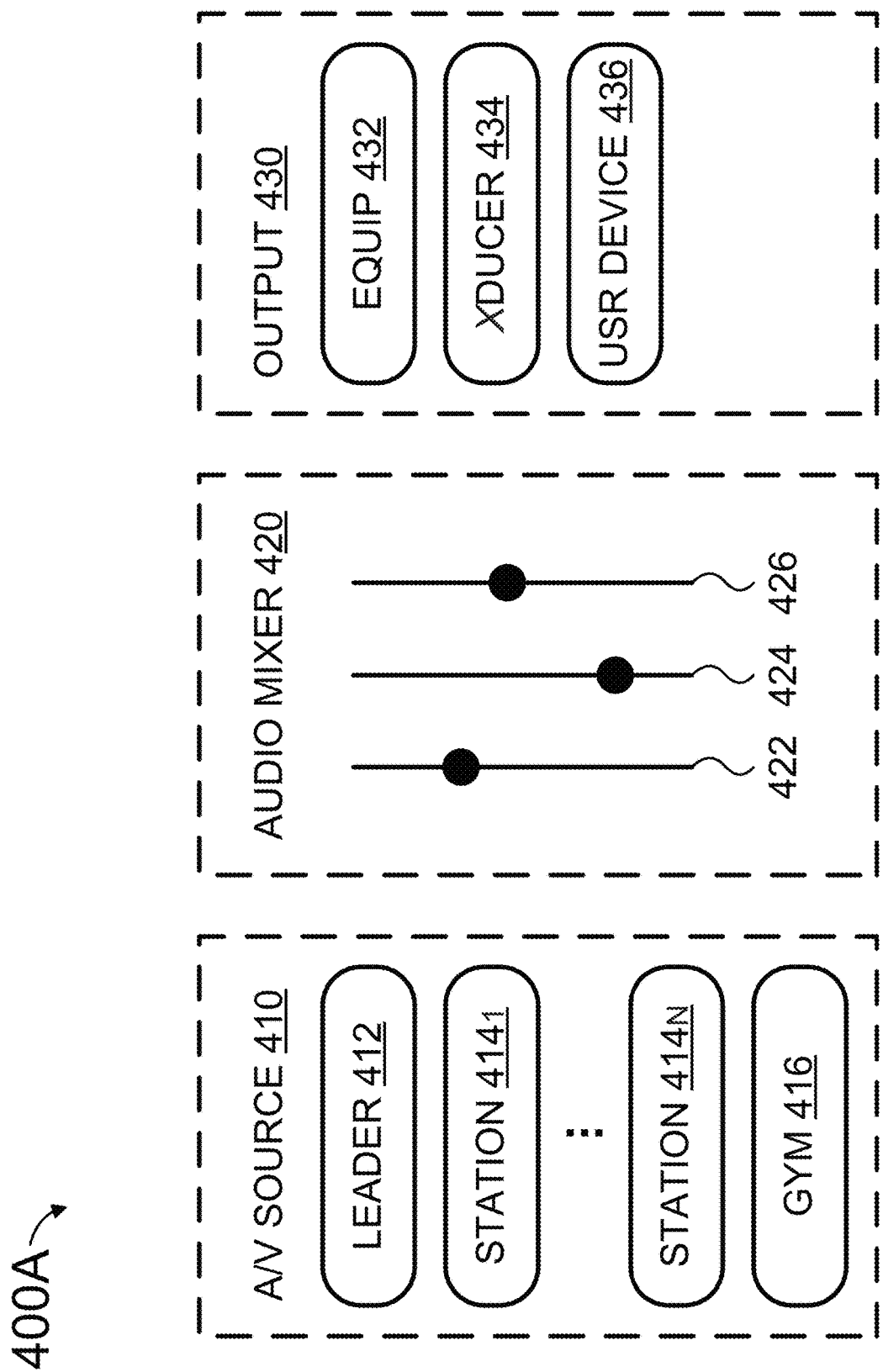
FIGS. 4A and 4B depict some control display elements, in accordance with various embodiments.
Figure 4B:
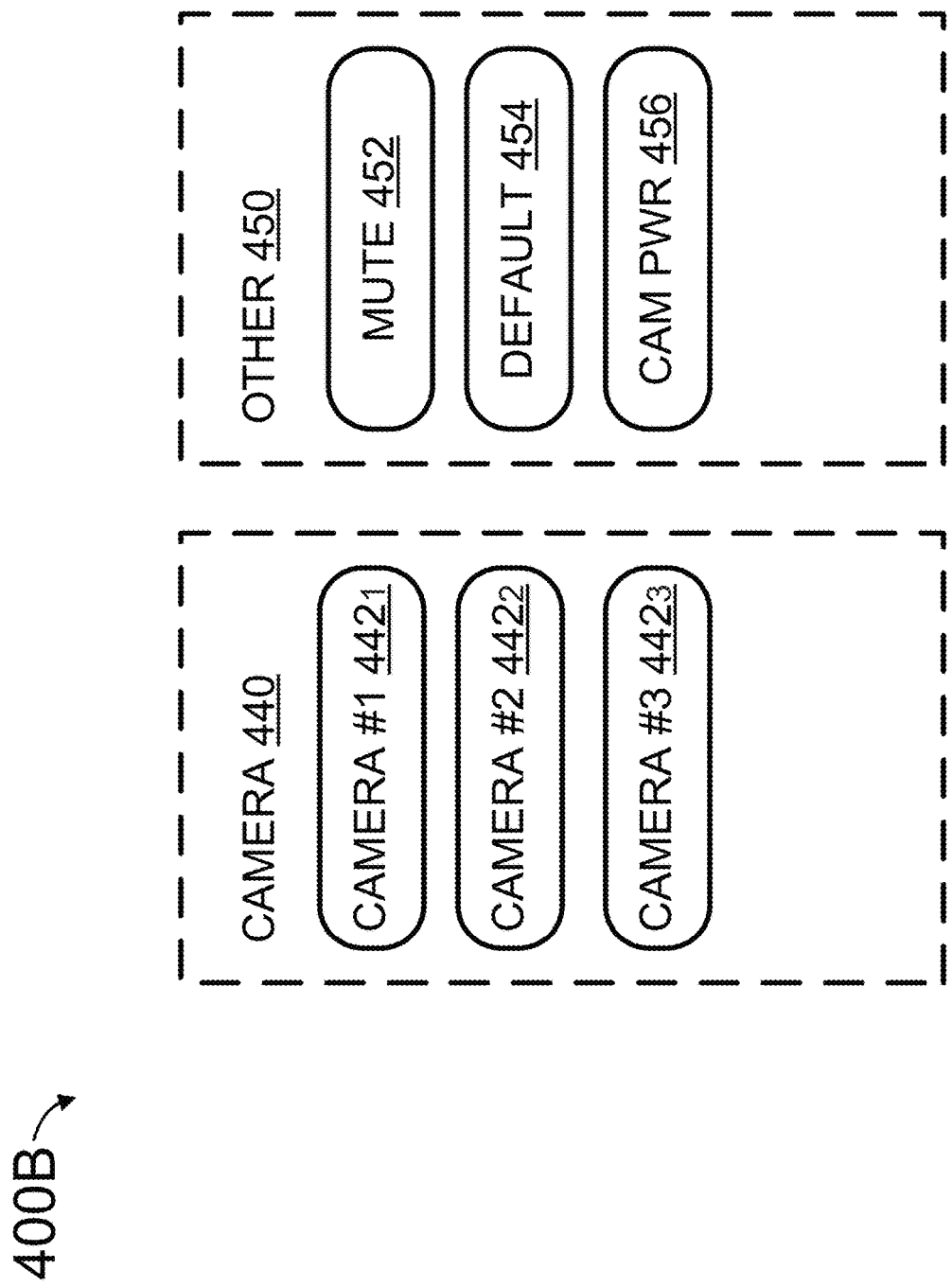

FIGS. 4A and 4B depict control display elements 400A and 400B respectively, in accordance with various embodiments. In FIG. 4A, control display elements 400A include audio/video source selector 410, audio mixer 420, and output selector 430. Audio/video source selector 410 can include (soft) buttons to select media from different sources such as trainer station 110 (FIG. 1), stations 150₁-150_N, and gym, using buttons 412, 414₁-414_N, and 416, respectively. Audio mixer 420 can be used to control the volume (e.g., from 0%-100% of volume) of each audio channel from any source. By way of non-limiting example, audio from trainer station 110 (FIG. 1) includes voice (e.g., instructions, stories, encouragement, etc.), background (e.g., music), and sound effects (e.g., sounds to denote changing intensity of the workout such as drum beats, crowd applause, crowd talking, etc.). In this example, (virtual) slider 422 controls voice, (virtual) slider 424 background, and (virtual) slider 426 special effects. When particular content has more than one channel (e.g., two-channel stereo), a slider can be provided for each channel (e.g., left and right channels). In various embodiments, separate audio mixer settings for a particular source are applied to (and retained for) each output selection.

Output selector 430 can direct any of media sources and content 300 (FIG. 3) to any of the speakers/headphones/earbuds and displays of exercise equipment computing device 230 (FIG. 2) and user computing device. For example, audio can be directed to stereo speakers on exercise equipment computing device 230 when button 432 is depressed, to wired/wireless headphones or earbuds coupled to exercise equipment computing device 230 when button 434 is depressed, and to user computing device (e.g., speakers, wired/wires headphones, earbuds, and the like) and/or user external audio equipment (e.g., a stereo system, (multi) media performance system, and the like) when button 436 is depressed.

In FIG. 4B, control display elements 400B include camera (video source) selector 440 and other buttons 450. Camera (video source) selector 440 can be used to choose camera $442_1$, camera $444_2$, $444_3$ and combinations thereof, where each camera provides a view, such as of trainer station 110 (FIG. 1) (a trainer view), a studio camera, and an audio disc jockey (DJ) view. Other buttons 450 can include mute 452, default mix 454, and camera on/off 456. Mute 452 lowers the volume of all active audio channels (e.g., coming out of an audio output device) to 0% when pressed and restores each channel to its prior level when pressed again. Muting all active audio outputs can be useful when user 210 (FIG. 2) participates in an audio or video call during a group exercise class.

Default mix 454 restores all active audio channels (e.g., coming out of an audio output device) to their initial level. For example, audio from trainer station 110 can be set to an initial level (e.g., selected by trainer station 110) when a group exercise commences, user 210 (FIG. 2) changes the mix (e.g., using audio mixer 420), and user 210 can restore the audio to the initial level by depressing default mix 454. Alternatively or additionally, default mix 454 can select a predetermined audio and/or video mix. For example, the trainer or user can specify the volume levels for various audio channels and/or a selection (combination) of video channels at a particular time(s) during the course of the group exercise class.

Camera on/off 456 deactivates all active cameras (e.g., in exercise equipment computing device and user computing device) when depressed and reactivates the cameras when camera on/off 456 is pressed again. Camera on/off 456 can be useful when a spouse, child, pet, and the like (e.g., when station 150 in FIG. 2 is in a private residence) enters a cameras visual field during a group exercise class.

Although a certain number of buttons and sliders are shown in FIGS. 4A and 4B, any number of buttons and sliders (e.g., associated with a number of available channels) can be used. Even though control display elements 400A and 400B are depicted as sliders and (soft) buttons, other graphical user interface elements (e.g., check boxes, pull down menus, radio buttons, dropdown lists, and the like) can be used.

Figure 5A:
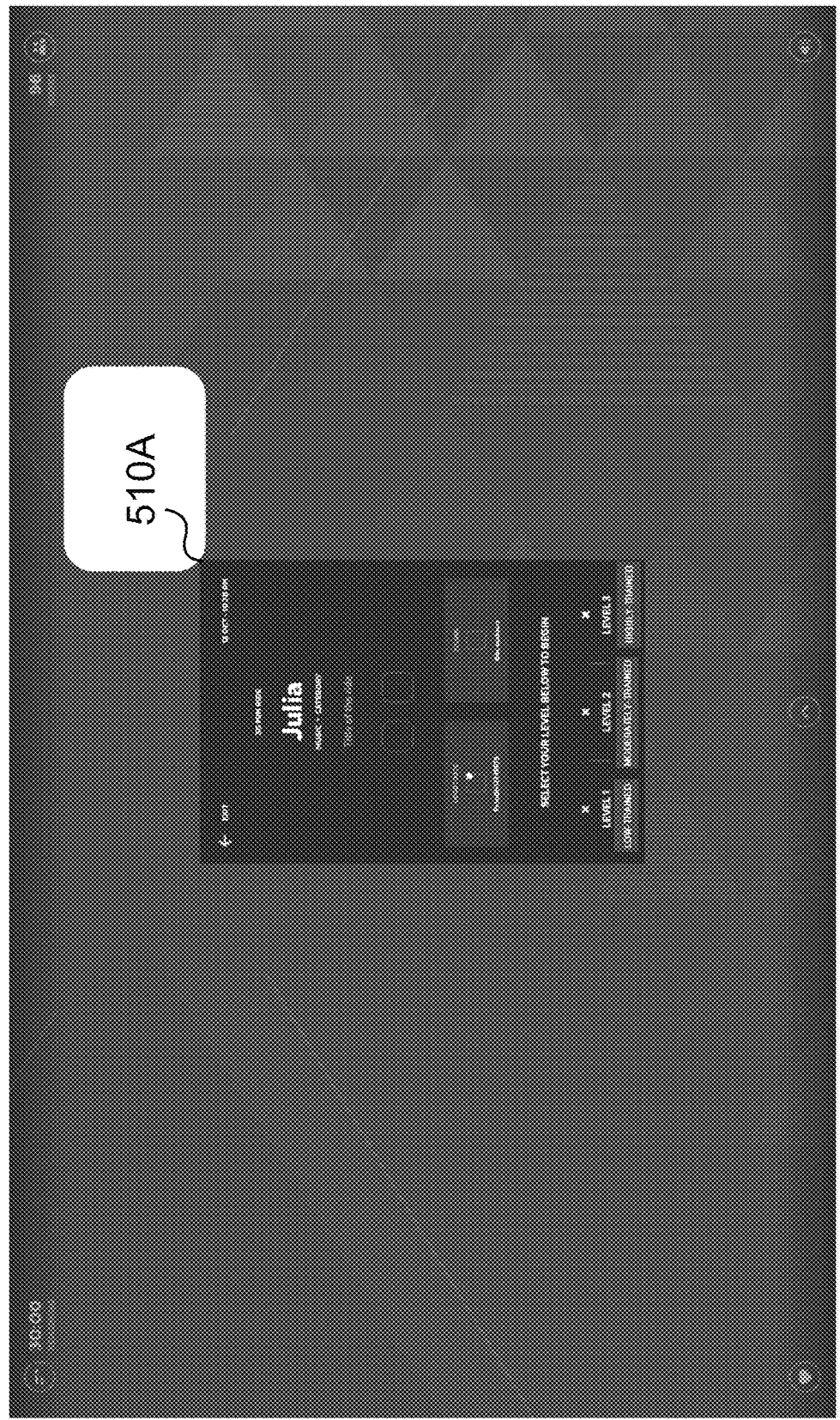
FIGS. 5A-5E present examples of interactive graphical user interfaces, according to some embodiments.
Figure 5B:
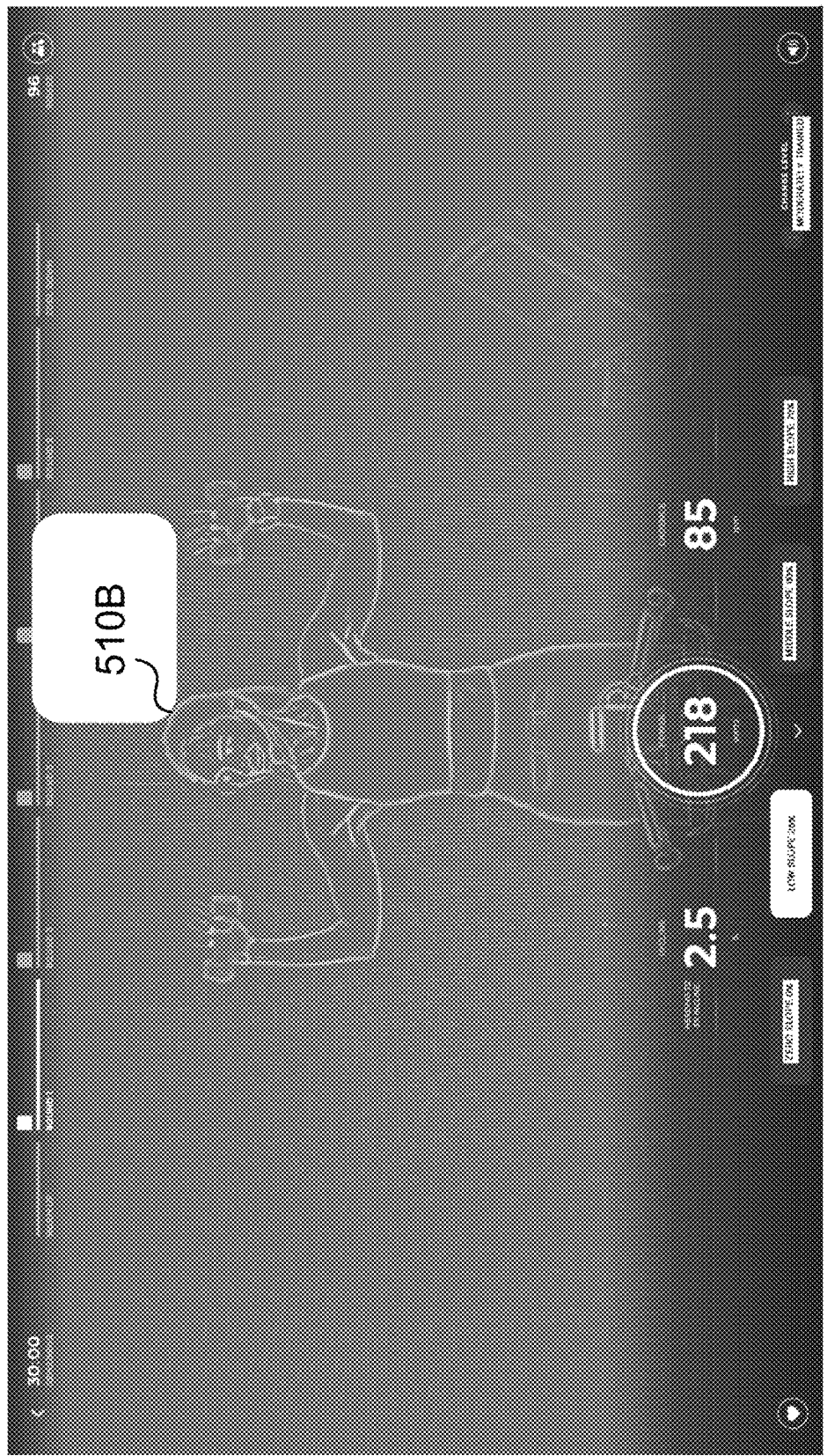
Figure 5C:
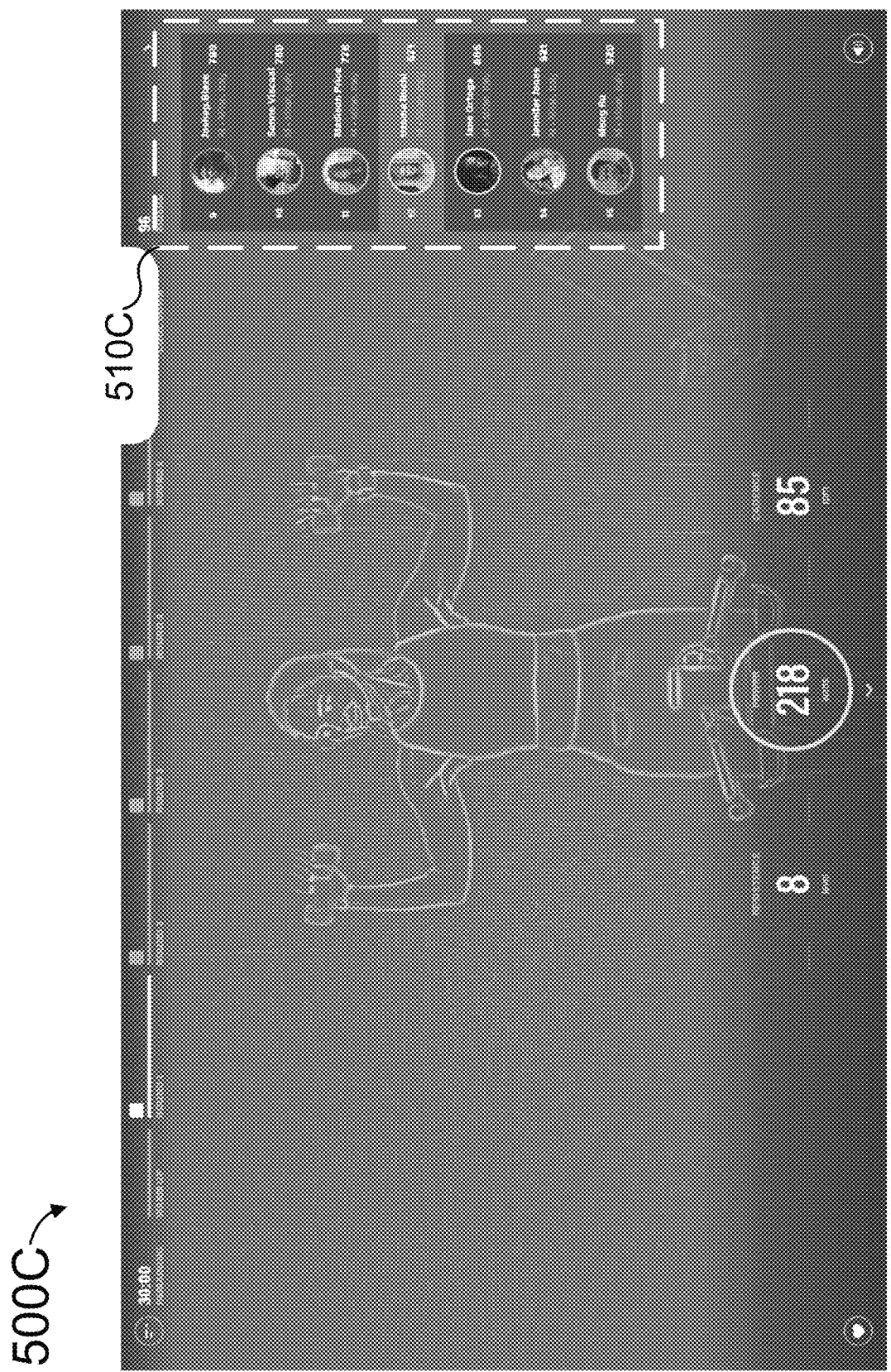
Figure 5D:
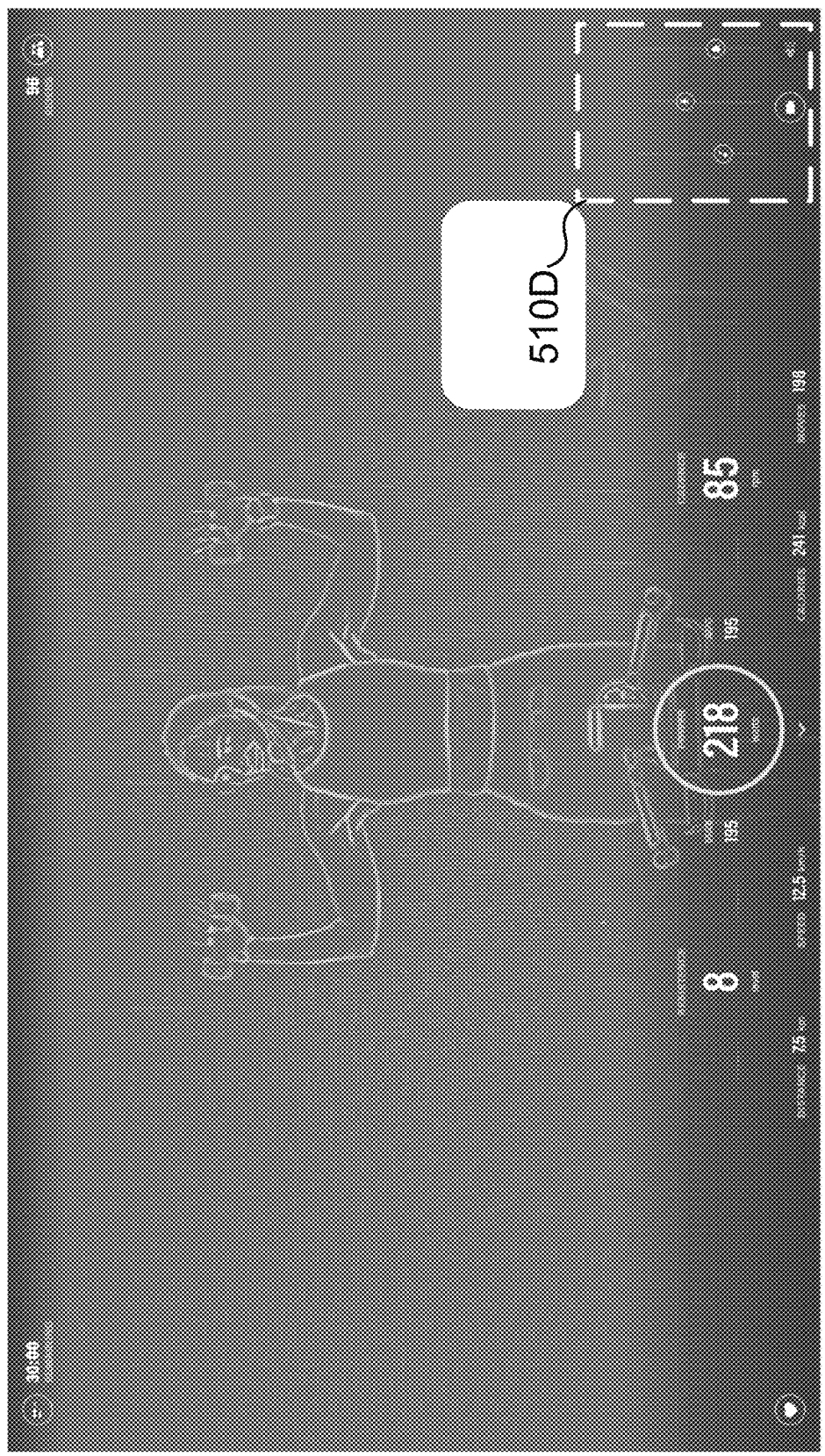
Figure 5E:
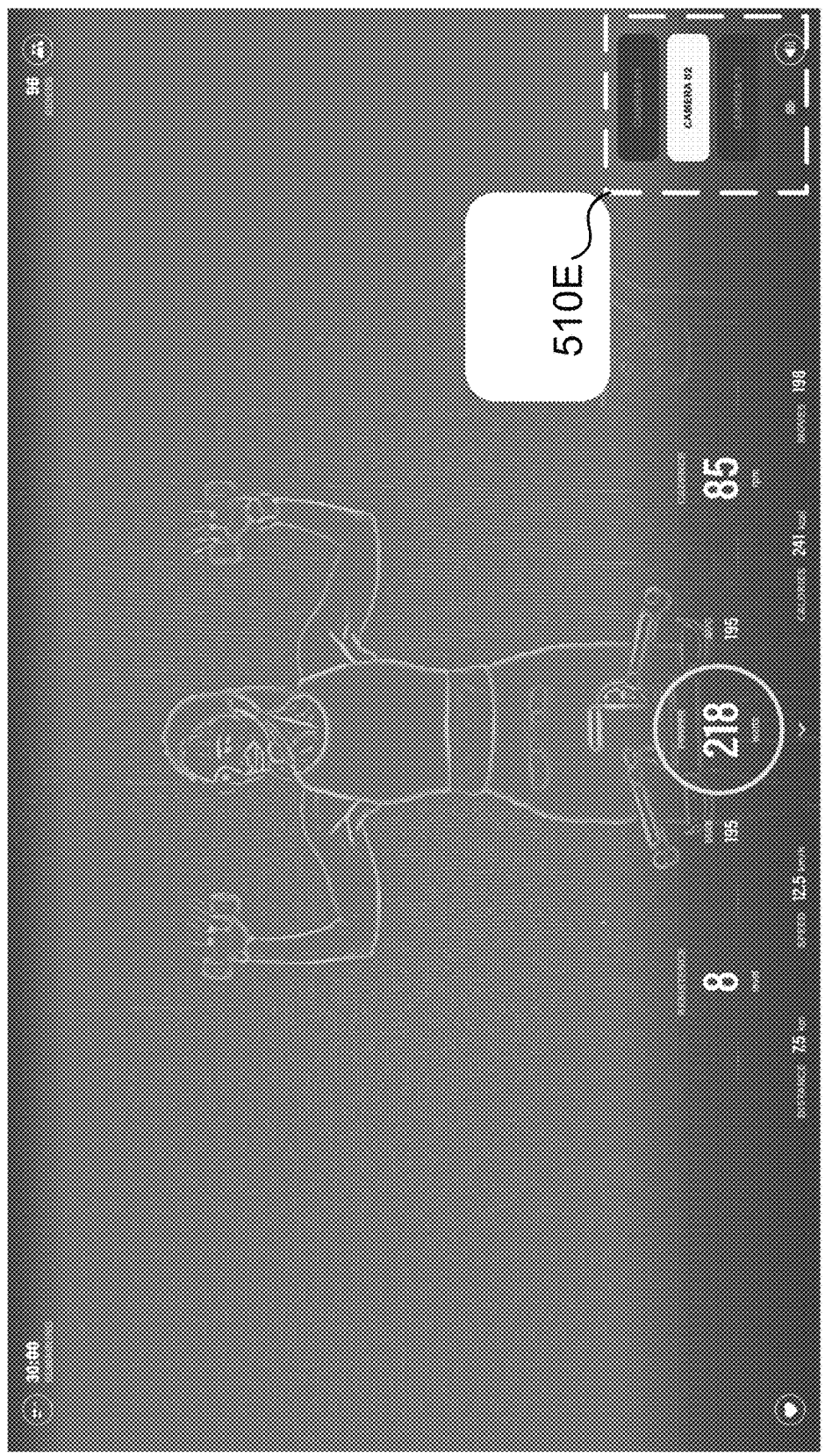

FIGS. 5A-E illustrate example displays 500A-500E (respectively) with arrangements of control display elements 400A and 400B (FIGS. 4A and 4B). For example, FIG. 5A depicts a music and starting level selection 510A for a group exercise class. FIG. 5B shows leader 510B (e.g., trainer station 110 in FIG. 1). FIG. 5C illustrates an audio and/or video source selector displaying stations 510C (e.g., stations $150_1$-$150_N$ in FIG. 1 and station 150 in FIG. 2). FIG. 5D depicts audio mixer 510D (e.g., audio mixer 420 in FIG. 4A). FIG. 5E shows camera selector 510E (e.g., camera selector 440 in FIG. 4B).

Figure 6:
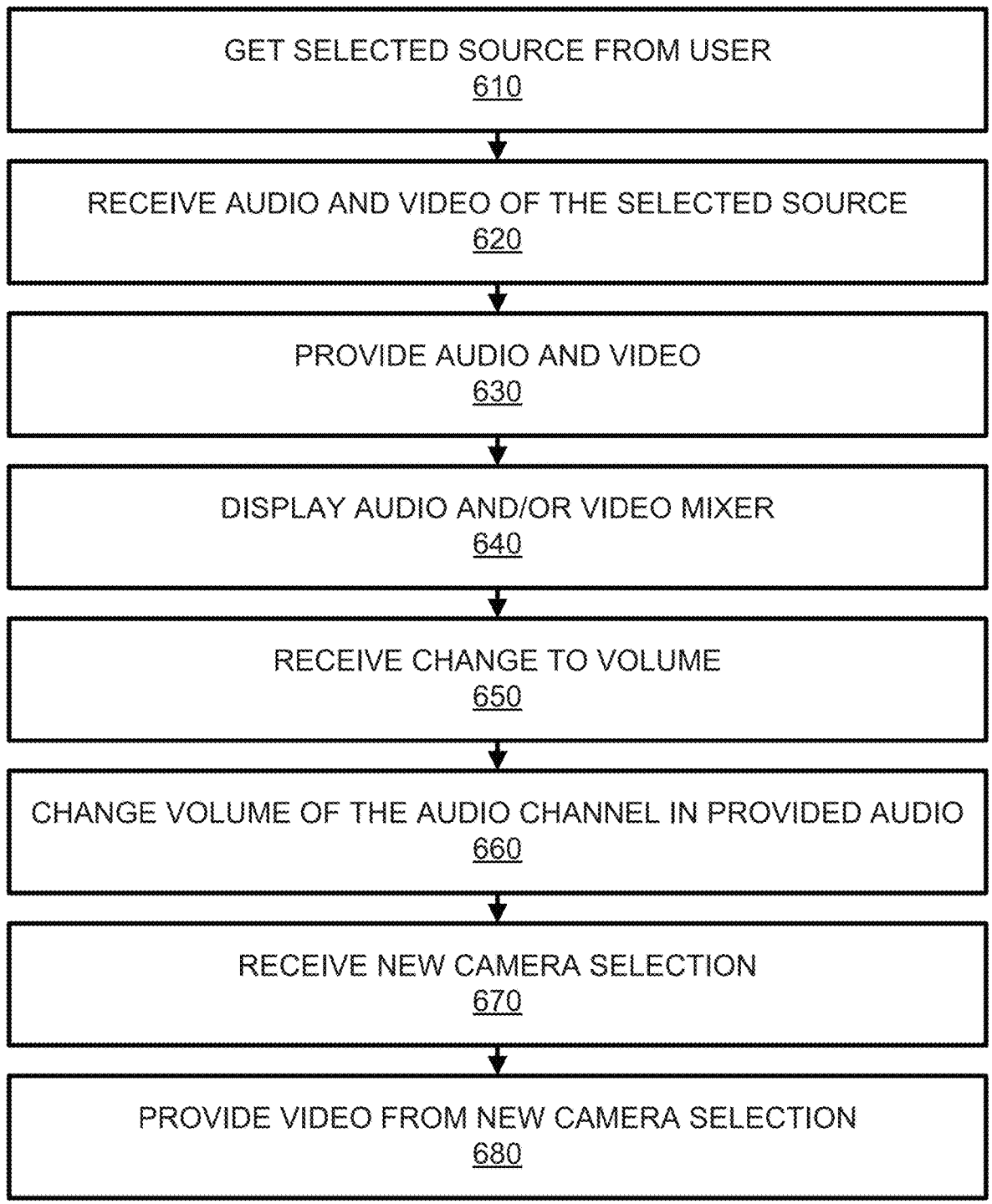
FIG. 6 is a simplified flow diagram of a method for adaptive delivery of audio and/or video channels in a group exercise class, according to various embodiments.

FIG. 6 shows method 600 for adaptive delivery of audio and video channels in a group exercise class, according to various embodiments. Method 600 can be performed by exercise equipment computing device 230 (FIG. 2). Method 600 can commence at step 610 where (optionally) a selected source can be received from a user. For example, user 210 (FIG. 2) can select a source using audio/video source selector 410 (FIG. 4A). By way of further example, exercise equipment computing device 230 receives user 210's selection using a touch screen. In various embodiments, the selected video source and audio source can be different sources.

At step 620, audio and video of the selected (or default) source are received. For example, the audio and video can be received via server 130 (FIG. 1). At step 630, audio and video from the selected source are provisioned with each audio channel at default/initial volume levels and a default/ initial camera selection. For example, the source selected is trainer station 110 (FIG. 1), where trainer station 110 has three audio channels (e.g., voice, background, and sound effects) at default/initial levels, and three camera channels with the first camera set as the default/initial camera.

At step 640, an audio and/or video mixer is displayed. For example, audio mixer 420 (FIG. 4A) and/or camera selector 440 (FIG. 4B) are presented on a display of by exercise equipment computing device 230 (FIG. 2). By way of further example, three sliders, sliders 422-426 (FIG. 4A), are provided to control the three audio channels from trainer station 110 (FIG. 1). Each of sliders 422-426 is displayed at its respective default/initial level. By way of additional example, three buttons, buttons $442_1$-$442_3$ (FIG. 4B), are provided to allow selection from the three cameras. For illustrative purposes, the default/initial level camera can be camera 1.

At step 650, an input indicating a change in the volume of an audio channel is received. For example, exercise equipment computing device 230 (FIG. 2) receives a change to (e.g., (virtual) movement of) one of sliders 422-426 from a user.

By way of further example, exercise equipment computing device 230 receives an input that satisfies a predetermined condition to (automatically) change the volume of an audio channel. A predetermined condition can be factors related to the group exercise class, such as a level of effort expended by the user, volume levels of other audio channels, reaching a particular part/point/time of the group exercise class, and the like. For example, as the user is getting close to (a proportion or fraction of, such as 75%-95% of) his/her maximum heart rate, such as by using a sensor of exercise equipment 220 in FIG. 2, the volume of the music or the volume of the background audio will automatically increase. By way of further example, the volume of one or more audio channels is automatically changed based on the volume of ambient noise in the exercise room or in the studio from which the trainer is broadcasting. By way of additional example, the volume of a special effects audio channel is changed based on the type, intensity, or volume of the music channel coming from the trainer (e.g., trainer station 110 in FIG. 1). Alternatively or additionally, a volume of a channel (e.g., music selected by the trainer) is changed as certain points of the group exercise class are reached (e.g., at a particular time in the workout, after a certain amount of time in the workout has elapsed). Other factors related to the group exercise class can be used, and other audio channels can be changed. The change can be an increase or decrease in the volume of a particular channel.

At step 660, the volume of the channel associated with the audio channel which was changed is adjusted. For example, when one of sliders 422-426 (FIG. 4B) is moved upward, the volume of the channel associated with the slider is increased. By way of further example, when one of sliders 422-426 is moved downward, the volume of the channel associated with the slider is decreased. Generally, when any of sliders 422-426 is at 100% volume (e.g., all the way up), then the volume for that channel cannot be increased further. More-over, when any of sliders 422-426 is at 0% volume (e.g., all the way down), then the volume for that channel cannot be decreased further.

At step 670, an input indicating a new camera selection is received. For example, exercise equipment computing device 230 (FIG. 2) receives an indication from a user (e.g., user 210 in FIG. 2) that a camera (different from the current camera) is selected. For illustrative purposes, camera 1 is the current view and button 442$_3$ (FIG. 4B) associated with camera 3 is selected.

At step 680, video from the selected camera is displayed. For example, when camera 3 is selected, video from camera 3 is presented on the display by exercise equipment computing device 230 (FIG. 2). By way of further non-limiting example, cameras of other users (e.g., at stations 150$_1$-150$_N$ in FIG. 1) can be alternatively selected when their cameras are enabled.

Although the steps of method 600 are depicted as being sequentially and in a particular order, the steps can be performed in a different order and some steps can be performed in parallel with other steps. For illustrative purposes, some control display elements are displayed by exercise equipment computing device 230 (FIG. 2) and some inputs described above are received from a user (e.g., user 210) by exercise equipment computing device 230. However, various control display elements can be displayed on/by the user computer device and various inputs can be received from user 210 through the user computer device. In some embodiments, the various inputs can be sent from the user computer device to the exercise equipment computing device 230.

Figure 7:
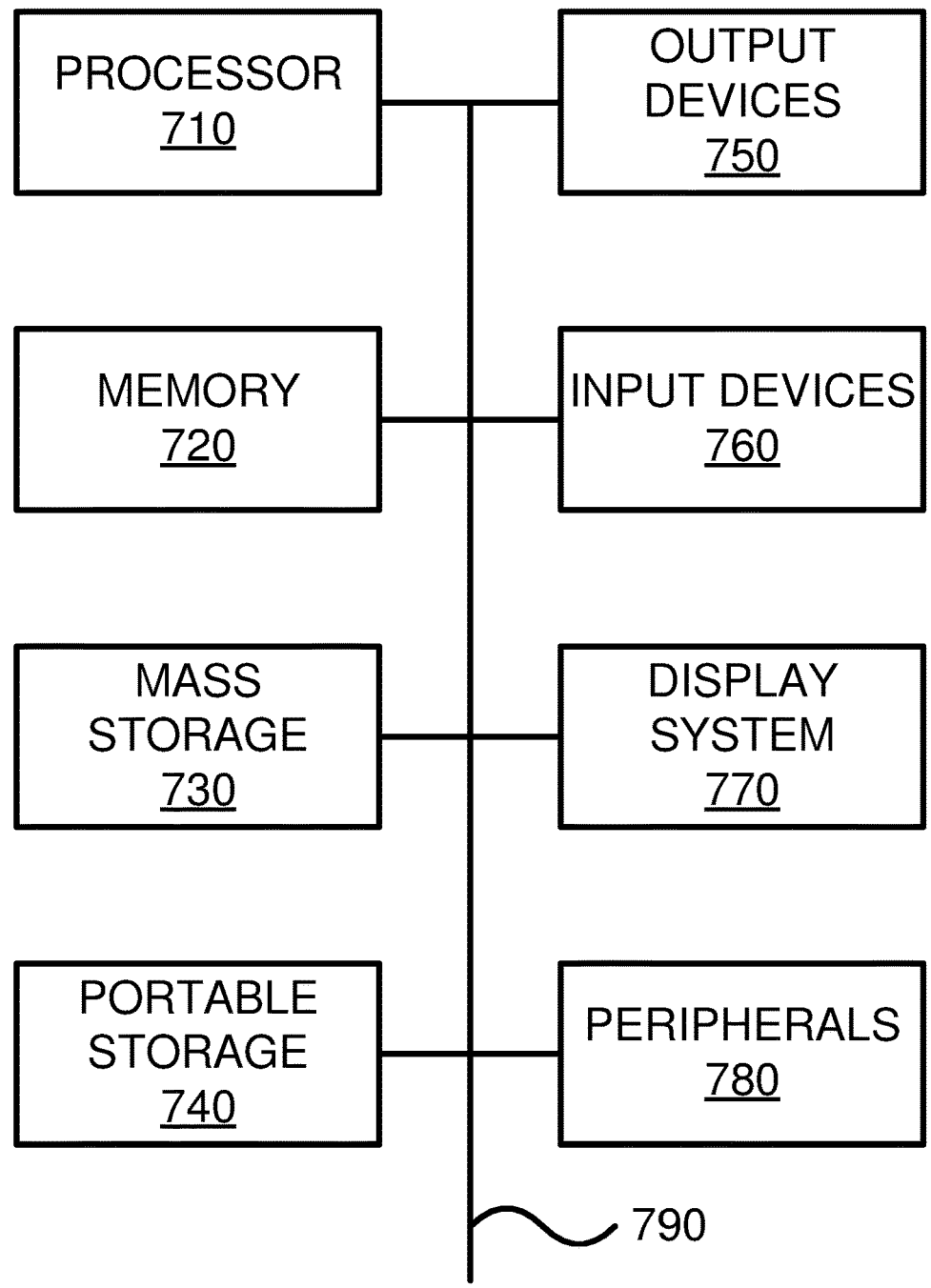
FIG. 7 is a simplified block diagram of a computing system, in accordance with some embodiments.

FIG. 7 illustrates an exemplary computer system 700 that may be used to implement some embodiments of the present invention. The computer system 700 in FIG. 7 may be implemented in the contexts of the likes of computing systems, networks, servers, or combinations thereof. The computer system 700 in FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 in FIG. 7 further includes a mass data storage 730, portable storage device 740, output devices 750, user input devices 760, a graphics display system 770, and peripheral device(s) 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 in FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral device(s) 780 may include any type of computer support device to add additional functionality to the computer system.

Some of the components provided in the computer system 700 in FIG. 7 can be those typically found in computer systems that may be suitable for use with embodiments of the present disclosure and are intended to represent a broad category of such computer components. Thus, the computer system 700 in FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 700 may be implemented as a cloud-based computing environment, such as a virtual machine operating within a computing cloud. In other embodiments, the computing system 700 may itself include a cloud-based computing environment, where the functionalities of the computing system 700 are executed in a distributed fashion. Thus, the computing system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for adaptive delivery of audio and video channels in a group exercise class, the method being performed by an exercise equipment computing device comprising at least one processor, the method comprising:
    getting a selection of a group exercise class from a user;
    receiving audio and video for the group exercise class over a communications network from a trainer station of the group exercise class, the audio and video for the group exercise class having a plurality of audio signals selected by the trainer station;
    playing the audio and video for the group exercise class, a volume level for each audio signal being at a respective initial value, the video being from a default camera;
    displaying an audio mixer, the audio mixer comprising a control for an audio mix of the plurality of audio signals associated with the group exercise class, the control comprising a discrete actuator for each of the plurality of audio signals of the audio mix;
    receiving a user selection to change the audio mix of at least two of the plurality of audio signals; and
    changing the audio mix played during the group exercise class in accordance with the user selection.

2. The computer-implemented method of claim 1, wherein the user selection to change the audio mix is manually provided to the exercise equipment computing device.

3. The computer-implemented method of claim 1, wherein the exercise equipment computing device receives an input that satisfies a predetermined condition to automatically change the volume level of one of the plurality of audio signals.

4. The computer-implemented method of claim 3, wherein the predetermined condition comprises at least one factor related to the group exercise class, the predetermined condition comprising at least one of a level of effort expended by the user, volume levels of other audio signals, and reaching a particular part, point, or time of the group exercise class.

5. The computer-implemented method of claim 3, wherein the method further comprises:
    making a first volume change to a volume level of another audio signal when a first condition is satisfied; and
    making a second volume change to the volume level of the another audio signal when a second condition is satisfied.

6. The computer-implemented method of claim 5, wherein:
    the first condition is a heart rate of the user being a first predetermined fraction of a maximum heart rate of the user, the heart rate of the user being detected by a sensor of an exercise equipment,
    the second condition is the heart rate of the user being a second predetermined fraction of the maximum heart rate of the user,
    the first predetermined fraction is less than the second predetermined fraction, and
    the first volume change and the second volume change each increase the volume level of the another audio signal.

7. The computer-implemented method of claim 5, wherein:
    the first condition is a first predetermined volume level of an ambient noise in a space from which a trainer of the group exercise class is conducting the group exercise class, and
    the second condition is a second predetermined volume level of the ambient noise in the space.

8. The computer-implemented method of claim 5, wherein:
    the first condition is a first volume level of a music channel selected by a trainer of the group exercise class, and
    the second condition is a second volume level of the music channel selected by the trainer.

9. The computer-implemented method of claim 5, wherein:
    the first condition is a first elapsed time in the group exercise class, the first elapsed time being selected by a trainer of the group exercise class; and
    the second condition is a second elapsed time in the group exercise class, the second elapsed time being selected by the trainer.

10. The computer-implemented method of claim 1, the method further comprising:
    showing a camera selector, the camera selector including a selection for each available camera; and
    provisioning video from another camera, when another input indicating a change to the another camera associated with a selected source is received using the camera selector.

11. The computer-implemented method of claim 1, further comprising:
    showing an output selector, the output selector including a selection for each available output device; and
    providing the audio to another available output device, when another input indicating a change to the another available output device is received using the output selector.

12. The computer-implemented method of claim 11, wherein the another available output device is at least one of a speaker associated with the exercise equipment computing device and a wireless headphone.

13. The computer-implemented method of claim 1, wherein:
    a volume level of an audio channel is increased when the input indicates the change is raising the volume level, and
    the volume level of the audio channel is decreased when the input indicates the change is lowering the volume level.

14. A system for adaptive delivery of audio and video channels in a group exercise class, the system comprising:
    exercise equipment;
    a processor physically coupled to the exercise equipment; and
    a memory communicatively coupled to the processor, the memory storing instructions executable by the processor to:
        get a selection of a group exercise class from a user;
        receive audio and video for the group exercise class over a communications network, the audio and video for the group exercise class having a plurality of audio signals that have been selected by a user of a trainer station;

play the audio and video for the group exercise class, a volume level for each of the plurality of audio signals being at a respective initial value, the video being from a default camera;

display an audio mixer comprising a control for each of the plurality of audio signals associated with the group exercise class, the control comprising a discrete actuator for each of the plurality of audio signals of an audio mix;

receive a user selection to change the audio mix of at least two of the plurality of audio signals; and change the audio mix played during the group exercise class in accordance with the user selection.

15. The system of claim 14, wherein the user selection to change the audio mix is manually provided to the system.

16. The system of claim 14, wherein the system receives an input that satisfies a predetermined condition to automatically change the volume level of one of the plurality of audio signals.

17. The system of claim 16, wherein the predetermined condition comprises at least one factor related to the group exercise class, the predetermined condition comprising at least one of a level of effort expended by the user, volume levels of other audio channels, and reaching a particular part, point, or time of the group exercise class.

18. The system of claim 16, wherein the method further comprises:

making a first volume change to a volume level of another audio signal when a first condition is satisfied; and making a second volume change to the volume level of the another audio signal when a second condition is satisfied.

19. The system of claim 18, wherein:

the first condition is a heart rate of the user being a first predetermined fraction of a maximum heart rate of the user, the heart rate of the user being detected by a sensor of the exercise equipment, the second condition is the heart rate of the user being a second predetermined fraction of the maximum heart rate of the user, the first predetermined fraction is less than the second predetermined fraction, and the first volume change and the second volume change each increase the volume of the another audio signal.

20. The system of claim 18, wherein:

the first condition is a first predetermined volume level of an ambient noise in a space from which a trainer of the group exercise class is conducting the group exercise class, and the second condition is a second predetermined volume level of the ambient noise in the space.

21. The system of claim 18, wherein:

the first condition is a first volume level of a music channel selected by a trainer of the group exercise class, and the second condition is a second volume level of the music channel selected by the trainer.

22. The system of claim 18, wherein:

the first condition is a first elapsed time in the group exercise class, the first elapsed time being selected by a trainer of the group exercise class, and the second condition is a second elapsed time in the group exercise class, the second elapsed time being selected by the trainer.

23. The system of claim 14, the memory storing further instructions executable by the processor to:

show a camera selector, the camera selector including a selection for each available camera; and provision video from another camera, when another input indicating a change to the another camera associated with a selected source is received using the camera selector.

24. The system of claim 14, further comprising:

showing an output selector, the output selector including a selection for each available output device; and providing the audio to another available output device, when another input indicating a change to the another available output device is received using the output selector.

25. The system of claim 24, wherein the another available output device is at least one of a speaker associated with the exercise equipment and a wireless headphone.

26. The system of claim 14, wherein:

the volume level of one of the plurality of audio signals is increased when the input indicates the change is raising the volume level; and the volume level of at least one of the plurality of audio signals is decreased when the input indicates the change is lowering the volume level.

27. A computer-implemented method for delivery of audio and video in a group exercise class, the method being performed by an exercise equipment computing device comprising at least one processor, the method comprising:

receiving audio and video of a group exercise class from a selected source over a communications network, the audio from the selected source having a plurality of audio mixes, whereby a volume level of each audio mix is set to a respective initial value;

displaying an audio mixer, the audio mixer comprising a control for selecting between the plurality of audio mixes associated with the group exercise class, wherein at least one of the plurality of audio mixes comprises a predetermined audio mix;

receiving a user selection to play an audio mix from the plurality of audio mixes during the group exercise class; and changing the audio mix of the group exercise class in accordance with the user selection.

28. The computer-implemented method of claim 27, wherein an exercise equipment computing device receives an input that satisfies a predetermined condition to automatically change a volume level of a selected audio mix.

29. The computer-implemented method of claim 28, wherein the predetermined condition comprises at least one factor related to the group exercise class, the predetermined condition comprising at least one of a level of effort expended by a user, and reaching a particular part, point, or time of the group exercise class.

30. The computer-implemented method of claim 27, wherein the method further comprises:

making a first volume change to a volume level of the audio mix when a first condition is satisfied; and making a second volume change to a volume level of another audio mix when a second condition is satisfied.

31. The computer-implemented method of claim 30, wherein:

the first condition is a first predetermined volume level of an ambient noise in a space from which a trainer of the group exercise class is conducting the group exercise class, and the second condition is a second predetermined volume level of the ambient noise in the space.

32. The computer-implemented method of claim 27, wherein at least one of the plurality of audio mixes comprises a mix of a voice of a trainer leading the group exercise class with background music.

\* \* \* \* \*